No. 631,983. Patented Aug. 29, 1899.
W. T. M. BRUNNEMER.
DRAFT DEVICE FOR AGRICULTURAL IMPLEMENTS.
(Application filed May 4, 1898.)
(No Model.)
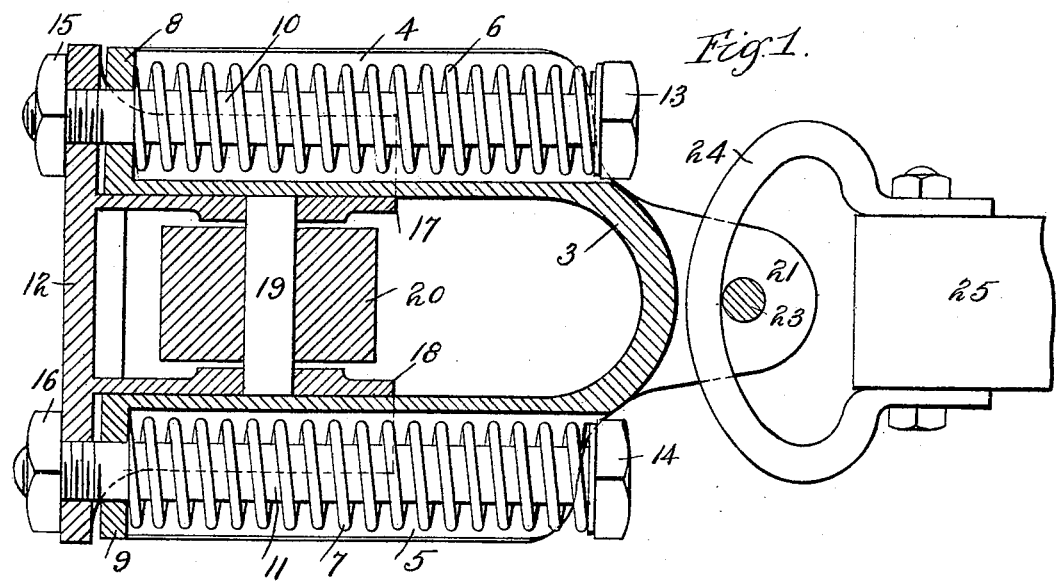
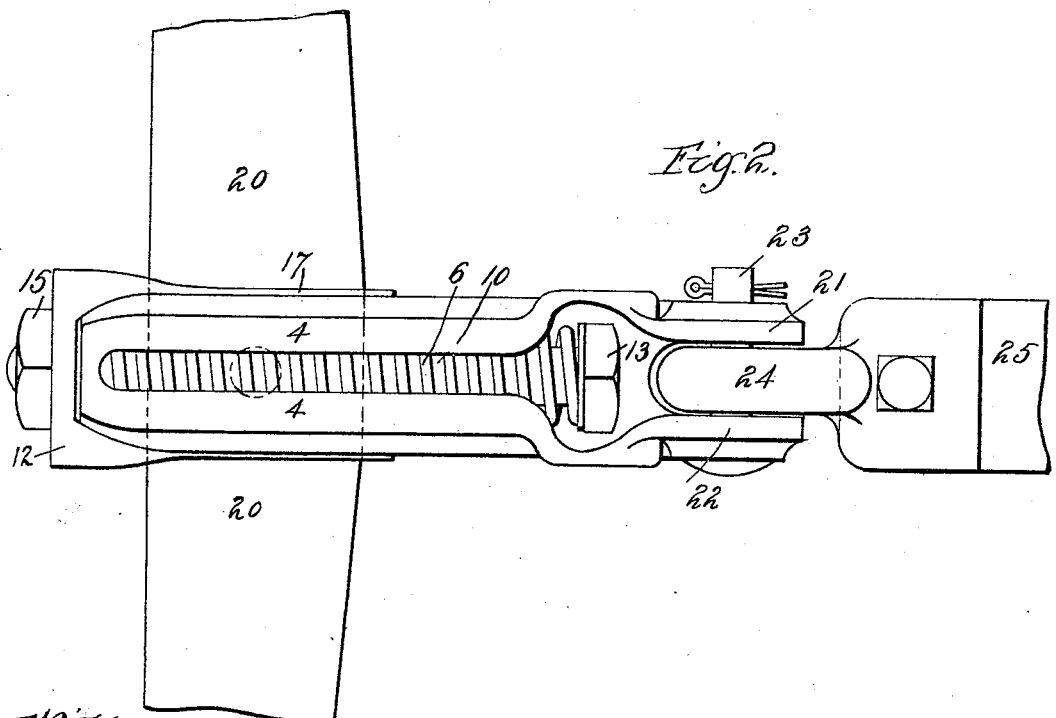
Witnesses
Inventor
William T. M. Brunnemer,
by
Atty's

UNITED STATES PATENT OFFICE.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS.

DRAFT DEVICE FOR AGRICULTURAL IMPLEMENTS.

SPECIFICATION forming part of Letters Patent No. 631,983, dated August 29, 1899.

Application filed May 4, 1898. Serial No. 679,701. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Draft Devices for Agricultural Implements, of which the following is a specification, reference being had to the accompanying drawings.

My invention relates to draft devices for agricultural implements, and has for its object to provide an improved spring-acting draft device which will be so constructed as to yield only slightly under normal working conditions and to yield much more under extraordinary conditions—such, for instance, as when the implement strikes a rock or any other similar obstacle. I accomplish this object as hereinafter described and as illustrated in the drawings.

What I regard as new will be set forth in the claims.

Referring to the accompanying drawings, Figure 1 is a longitudinal vertical section. Fig. 2 is a plan view.

In the drawings, 3 indicates a U-shaped frame or yoke having spring-pockets 4 5 at its opposite sides.

6 7 indicate springs which are fitted in the pockets 4 5. The forward ends of the springs 6 7 are seated against end pieces 8 9 of the pockets 4 5, respectively, as shown in Fig. 1.

10 11 indicate bolts which extend through the springs 6 7, respectively, and through the end pieces 8 9, as shown in Fig. 1, being connected at their forward ends to a cross-head 12. The rear ends of the springs 6 7 are seated against the heads 13 14 of the bolts 10 11, respectively, as shown in Fig. 1. When it is desired to remove the bolts and springs, the nuts 15 16 of the bolts 10 11, respectively, may be removed.

17 18 indicate guide-plates which are secured perpendicularly to the cross-head 12 and bear against the convex faces of the spring-pockets 4 5, as shown in Fig. 1. The guide-plates 17 18 are preferably semicylindrical to provide extended bearing-surfaces.

19 indicates a pin the ends of which are secured in the opposite guide-plates 17 18, as shown in Fig. 1.

20 indicates a whiffletree which is pivoted upon the pin 19.

By this construction when draft is applied to the whiffletree the guide-plates 17 18 and the cross-head 12 are drawn forward, compressing the springs 6 7 between the bolt-heads 13 14 and the end pieces 8 9 of the spring-pockets.

21 22 indicate ears extending to the rear from the yoke 3, as shown in Fig. 2.

23 indicates a pin which is secured to the ears 21 22 and serves as a means for coupling the draft device to the clevis 24 of the plow-beam 25.

I have shown my improved draft device as connected to a plow-beam; but it may be similarly connected to other implements.

Instead of the form of clevis shown in the drawings any suitable clevis or other connecting device may be used.

In operation the draft is applied to the whiffletree 20, and the tension of the springs 6 7 is such that under normal working conditions they are compressed to a slight extent only. When, however, the implement meets with some extraordinary resistance, the springs may yield to a much greater extent, preventing injury to the implement. By adjusting the nuts 15 16 upon the bolts 10 11 the extent to which the springs are compressed under normal conditions may be regulated as desired.

That which I claim as my invention, and desire to secure by Letters Patent, is—

1. In a draft device, the combination with a yoke having spring-holding pockets, and springs in said pockets, of a cross-head outside said pockets, means connected with said cross-head movable longitudinally with reference to said yoke for putting said springs under tension, and means for connecting the team to said cross-head, substantially as described.

2. In a draft device, the combination with a U-shaped yoke having spring-pockets at opposite sides thereof, and springs in said pockets, of a cross-head movable longitudinally with reference to said yoke, bolts connected to said cross-head and extending through said springs, said bolts carrying seats for the rear ends of said springs, and means for connecting the team to said cross-head between the branches of said yoke, substantially as described.

3. In a draft device, the combination with a U-shaped yoke having spring-pockets at opposite sides thereof, and springs in said pockets, of a cross-head movable longitudinally with reference to said yoke, bolts adjustably connected to said cross-head and extending through said springs, said bolts carrying seats for the rear ends of said springs, and means for connecting the team to said cross-head between the branches of said yoke, substantially as described.

4. In a draft device, the combination with a U-shaped yoke having spring-pockets at opposite sides thereof, and springs in said pockets, of a cross-head movable longitudinally with reference to said yoke, guide-plates arranged perpendicularly to said cross-head, and bearing against the inner faces of said yoke, bolts connecting said cross-head to the rear ends of said springs, and a draft device connected to said guide-plates, substantially as described.

WILLIAM T. M. BRUNNEMER.

Witnesses:
   GEO. S. MIDDLEBROOK,
   GEO. C. MORGAN, Jr.